K. SCHNETZLER.
DRIVING OF SINGLE PHASE MOTORS.
APPLICATION FILED MAR. 19, 1910.

1,059,772.

Patented Apr. 22, 1913.

Attest.
Benth M. Stahl.
Edward N. Saxton

Inventor.
Karl Schnetzler.
by Spear, Middleton, Donaldson & Spear
Attys

UNITED STATES PATENT OFFICE.

KARL SCHNETZLER, OF BADEN, SWITZERLAND, ASSIGNOR TO AKTIENGESELLSCHAFT BROWN, BOVERI & CIE., OF BADEN, SWITZERLAND.

DRIVING OF SINGLE-PHASE MOTORS.

1,059,772.      Specification of Letters Patent.      Patented Apr. 22, 1913.

Application filed March 19, 1910. Serial No. 550,361.

*To all whom it may concern:*

Be it known that I, KARL SCHNETZLER, a subject of the Emperor of Germany, residing at Burghaldenstrasse 951, Baden, Switzerland, have invented certain new and useful Improvements in and Relating to the Driving of Single-Phase Motors, of which the following is a specification.

This invention relates to the driving of single-phase motors and more particularly to a method of driving, of the general character of that set forth in application for Letters Patent No. 543,348, filed on the 2nd day of November, 1910, in which an arrangement is described which makes it possible to attach two single-phase motors which are of the same size and which are coupled together to a three-phase current network, without the aid of a transformer, in such a manner that the phases of the three-phase current network are equally loaded. The arrangement is such that the single-phase motors are driven from polyphase mains by taking current from part of the phases to drive one motor and current from the other part of the phases to drive the other, the two motors being suitably connected mechanically.

The voltage for which the stator windings of the two components of the arrangement must be designed, are in the ratio of 1:0.87, and the case may arise, especially if the voltage of the network is low and the power of the motor high that the given voltages lead to inconvenient numbers of bars or slots for one or the other stator, if the condition of equality is to be maintained. This may be remedied by altering the voltage for a slight amount.

The object of the present invention is to obtain a method of driving by altering the voltage as referred to above.

The invention consists in an improved arrangement for the driving of single-phase motors from polyphase mains in which one of the stators is directly attached to the network, while the other obtains a suitably varied voltage by means of a transformer such as an auto-transformer.

Figure 1:
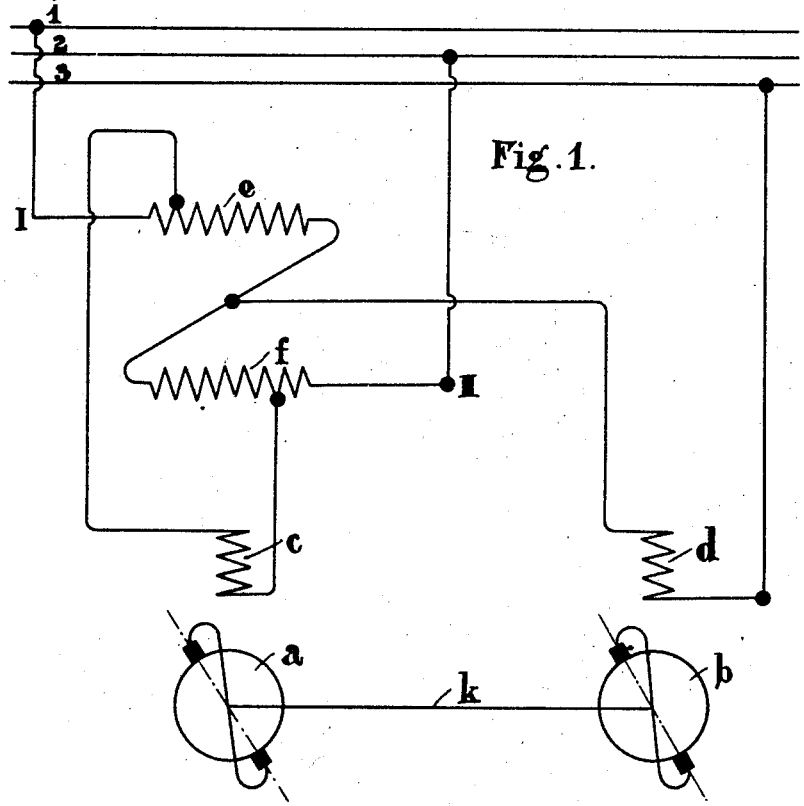
Figure 2:
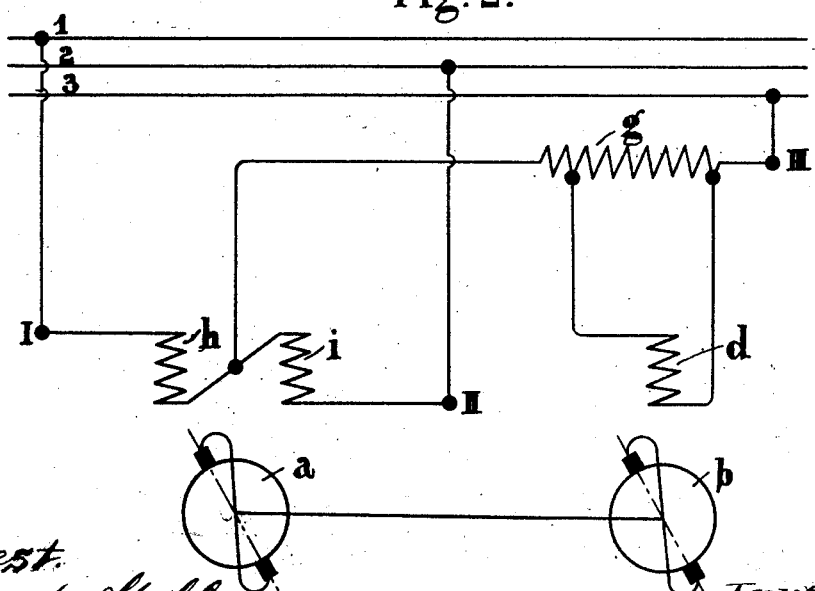

Referring now to the accompanying diagrammatic drawings which show the invention applied in one manner to two single-phase motors, one of which (*a*) is excited from two-phases of a three-phase network, and the other (*b*) from one phase, Figure 1 shows an arrangement in which the suitable alteration of voltage is effected in driving the motor *a*, and Fig. 2 an arrangement where it is effected in driving the motor *b*.

In carrying the invention into effect in the form illustrated in Fig. 1, two single-phase motors *a* and *b* are mechanically coupled, for example, as indicated at *k*. The motor *a* is driven or excited by the winding *c* which is fed from two phases of a three-phase network through auto-transformers *e* and *f* connected to the mains 1 and 2 at the terminals I and II. The second motor *b* is excited by the winding *d* connected to the third main 3 at the terminal III and to the junction of the windings *e* and *f*.

Referring now to Fig. 2 of the drawings, the motors remain as before, but in this case the motor *a* is excited by windings *h* and *i*, connected to the network without transformers at the terminals I and II, and the motor *b* is excited by the winding *d* through an auto-transformer *g*, connected with the network at the terminal III and with the windings *h* and *i* at their common point.

It will be understood that the ratio of transformation in each case where transformers are used is adjusted to the proper amount for proper proportioning of the exciting windings consistent with convenient arrangement of them.

Having now described my invention what I claim as new and desire to secure by Letters Patent is:—

1. In dynamo electric machinery in combination two single phase alternating current motors including stators and rotors, alternating current polyphase mains windings on said stators, electrical connections from the winding on one stator to part of the mains, an electrical connection from the winding on the other stator in part to other of the mains together with an electrical connection between the two windings, a voltage changing device also being included in the connection between one stator and the mains; as set forth.

2. In dynamo electric machinery in combination two single phase alternating current motors including stators and rotors, alternating current polyphase mains, windings on said stators, electrical connections from one of said windings to part of the mains and from the other of said windings in part to other of the mains together with an auto-transformer connected between one of said windings and one of said mains and an electrical connection from the auto transformer to the other of the windings; as set forth.

3. In combination two single phase dynamo electric motors including stators and rotors, alternating current three-phase mains, an auto transformer, electrical connections from one stator to said mains through part of said transformer winding and from the other stator to said mains through the intermediary of said transformer; as set forth.

4. In dynamo electric machinery in combination two electrical rotors, a mechanical connection between said rotors, an electrical winding disposed in proximity to one of said rotors and a second winding disposed in proximity to the other of said rotors, alternating current three-phase mains, a further electrical winding, a connection from one of said mains to one end of said further electrical winding and from a second of said mains to the other end of said winding, an electrical connection from the winding disposed in proximity to the first rotor to one point in said further electrical winding connected to the mains and an electrical connection from the other end of said first winding to another point in the winding connected to the mains together with an electrical connection from a point in said further electrical winding to the winding disposed in proximity to the second rotor and a further electrical connection from the other end of that winding to the third main; as set forth.

5. In dynamo electric machinery in combination two single phase dynamo electric motors including stators and rotors, alternating current, 3 phase mains and an auto-transformer, windings on said stators, electrical connections between one of said windings and said mains, in part through the intermediary of one part of the transformer and electrical connections between the other winding and the other part of said transformer; as set forth.

6. In combination two single phase dynamo electric motors including stators and rotors, alternating current three phase mains, an auto transformer, a plurality of electrical connections between one of said stator windings and the said mains through the intermediary of said auto transformer and further electrical connections between the other stator winding and a portion of the auto transformer winding; as set forth.

In testimony whereof, I affix my signature in presence of two witnesses.

KARL SCHNETZLER.

Witnesses:
  ALBERT AICHELE,
  CURT HOENIG.